(12) United States Patent
Hibi et al.

(10) Patent No.: US 6,572,797 B1
(45) Date of Patent: Jun. 3, 2003

(54) METHOD OF CONTROLLING OPERATION OF INJECTION MOLDING SYSTEM

(75) Inventors: Kouzou Hibi, Aichi-ken (JP); Hideaki Shirai, Aichi-ken (JP)

(73) Assignee: Kabushiki Kaisha Meiki Seisakusho, Aichi-Ken (JP)

( * ) Notice: Subject to any disclaimer, the term of this patent is extended or adjusted under 35 U.S.C. 154(b) by 294 days.

(21) Appl. No.: 09/702,663

(22) Filed: Nov. 1, 2000

(30) Foreign Application Priority Data

Nov. 1, 1999 (JP) .......................................... 11-310745

(51) Int. Cl.⁷ .............................................. B29C 45/76
(52) U.S. Cl. ................... 264/40.1; 264/232; 264/297.2; 264/328.1; 264/1.33; 425/135; 700/200; 700/213
(58) Field of Search ................................ 264/40.1, 129, 264/232, 297.1, 297.2, 297.4, 297.8, 328.1, 340, 1.1, 1.7, 1.33, 238; 425/135, 136, 143; 700/213, 200; 156/500

(56) References Cited

U.S. PATENT DOCUMENTS 5,316,707 A    5/1994 Stanciu et al.
5,753,279 A  *  5/1998 Takada et al. .............. 425/526

* cited by examiner

Primary Examiner—Jill L. Heitbrink
Assistant Examiner—Monica A Fontaine
(74) Attorney, Agent, or Firm—Browdy and Neimark, P.L.L.C.

(57) ABSTRACT

A method of controlling operation of an injection molding system in which at least one injection molding device successively executes an injection molding operation thereof so as to successively produce the molded product, and at least one takeout device successively takes out the molded product from the corresponding injection molding device so as to successively transfer the molded product to a subsequent-step part in which the molded product is further processed, while a monitoring device is arranged for detecting an abnormal operation in the subsequent-step part and generating an abnormal signal upon detection of the abnormal signal, the method comprising the steps of: changing an operation mode of the at least one of takeout device so as to transfer the molded disk to another part which is separate from the subsequent-step part, upon generation of the abnormal signal by the monitoring device; and extending a cycle time of the injection molding operation of the at least one injection molding device upon generation of the abnormal signal by the monitoring device.

7 Claims, 3 Drawing Sheets

METHOD OF CONTROLLING OPERATION OF INJECTION MOLDING SYSTEM

BACKGROUND OF THE INVENTION

1. Field of the Invention

The present invention relates generally to a method of controlling operation of an injection molding system for producing a desired product such as a compact disk (CD), a digital video disk (DVD), or the like, wherein the product is molded by an injection molding machine and is further processed in the following or subsequent step or steps. More particularly, the present invention is concerned with such a method of controlling operation of an injection molding system, which method permits the injection molding system to resume its operation in a short time, with a minimized loss of manufacture, when the subsequent step or steps is/are troubled.

2. Description of the Related Art

There is known an injection molding system in which a desired product is molded by an injection molding machine and is then processed in the subsequent step or steps. In this conventional molding system, the injection molding machine is arranged to be held in its normal operation mode so as to continue its injection molding operation, even where the subsequent step(s) is/are unavailable for processing the molded products. There is also known another injection molding system in which a plurality of injection molding machines produce components of a desired product, respectively, and these components are transported to the subsequent common step(s) so as to be assembled into the desired product. In this conventional molding system, each of the injection molding machines is also arranged to be held in its normal operation mode so as to continue its injection molding operation, even in the case where the plurality of injection molding machines are not simultaneously started so that the molded components cannot be assembled in the subsequent step(s).

In order to solve the above-described problems, it can be envisioned a method of once stopping the injection molding machine. However, this method is not practical, since the method causes undesirable decrease in temperature of a mold of the injection molding machine and accordingly causes variation of temperature of a mass of molten or plasticized resin material stored in a heating cylinder of the injection molding machine, thereby requiring a relatively long interval before resuming the injection molding operation of the injection molding machine. This means that the injection molding machine of the conventional injection molding systems is necessarily required to be held in its normal operating condition, even if the subsequent or other step(s) becomes unavailable. In this condition, an injection molding system for producing a CD, for example, may produce a stack of a larger number of molded disk substrates to be processed in the subsequent step(s), requiring a separate storage of these molded disk substrate and a re-execution of only the subsequent step(s) with respect to these stored molded disk substrates. Thus, the conventional injection molding system for producing the CD suffers from extremely low production efficiency.

Further, in a conventional injection molding system for producing a DVD or the like, for example, two injection molding machines produce respective component disks which are transferred to the subsequent common step(s) to provide a bonded composite disk used as the DVD. In this case, the two injection molding machines are required to substantially simultaneously produce the component disks to be bonded together into the bonded composite disk. If this requirement is not satisfied, the resultant bonded composite disk may suffer from occurrence of defects such as bending or buckling thereon. When one of the two injection molding machines does not operate due to a delay in its starting operation, or a stop of its operation, the other injection molding machine is still held in its normal operation mode so as to produce the component disks. Thus, the component disks molded by the other injection molding machine cannot be utilized for producing the bonded composite disks, until the operation of the one injection molding machine is started or resumed, resulting in undesirable disposal of these molded component disks.

SUMMARY OF THE INVENTION

The present invention has been developed in view of the circumstances described above. It is therefore an object of the present invention to provide a method of controlling operation of an injection molding system, which method permits an improved production efficiency of the injection molding system and allows an injection molding device to resume its operation in a short time, when the subsequent step or steps is/are malfunctioned.

The above-indicated object of the present invention may be achieved according to a principle of this invention which provides a method of controlling operation of injection molding device including at least one injection molding device successively executes an injection molding operation thereof so as to successively produce a molded product, at least one takeout device successively takes out the molded product from the corresponding injection molding device so as to successively transfer the molded product to a subsequent-step part adapted to further process the molded product, and a monitoring device adapted to detect an abnormal operation in the subsequent-step part and generate an abnormal signal upon detection of the abnormal operation, the method comprising the steps of: changing an operation mode of the at least one takeout device so as to transfer the molded disk to a part which is separate from the subsequent-step part, upon generation of the abnormal signal by the monitoring device; and extending a cycle time of the injection molding operation of the at least one injection molding device, upon generation of the abnormal signal by the monitoring device.

Preferably, the extension of the cycle time is executed by controlling a cooling time and/or an intermediate time after a completion of the product-takeout action and before an initiation of the mold closing action, by a suitable timer.

BRIEF DESCRIPTION OF THE DRAWINGS

The above and other objects, features, advantages and technical and industrial significance of the present invention will be better understood by reading the following detailed description of the presently preferred embodiment of the invention, when considered in connection with the accompanying drawings, in which.

DETAILED DESCRIPTION OF THE PREFERRED EMBODIMENT

Figure 1:
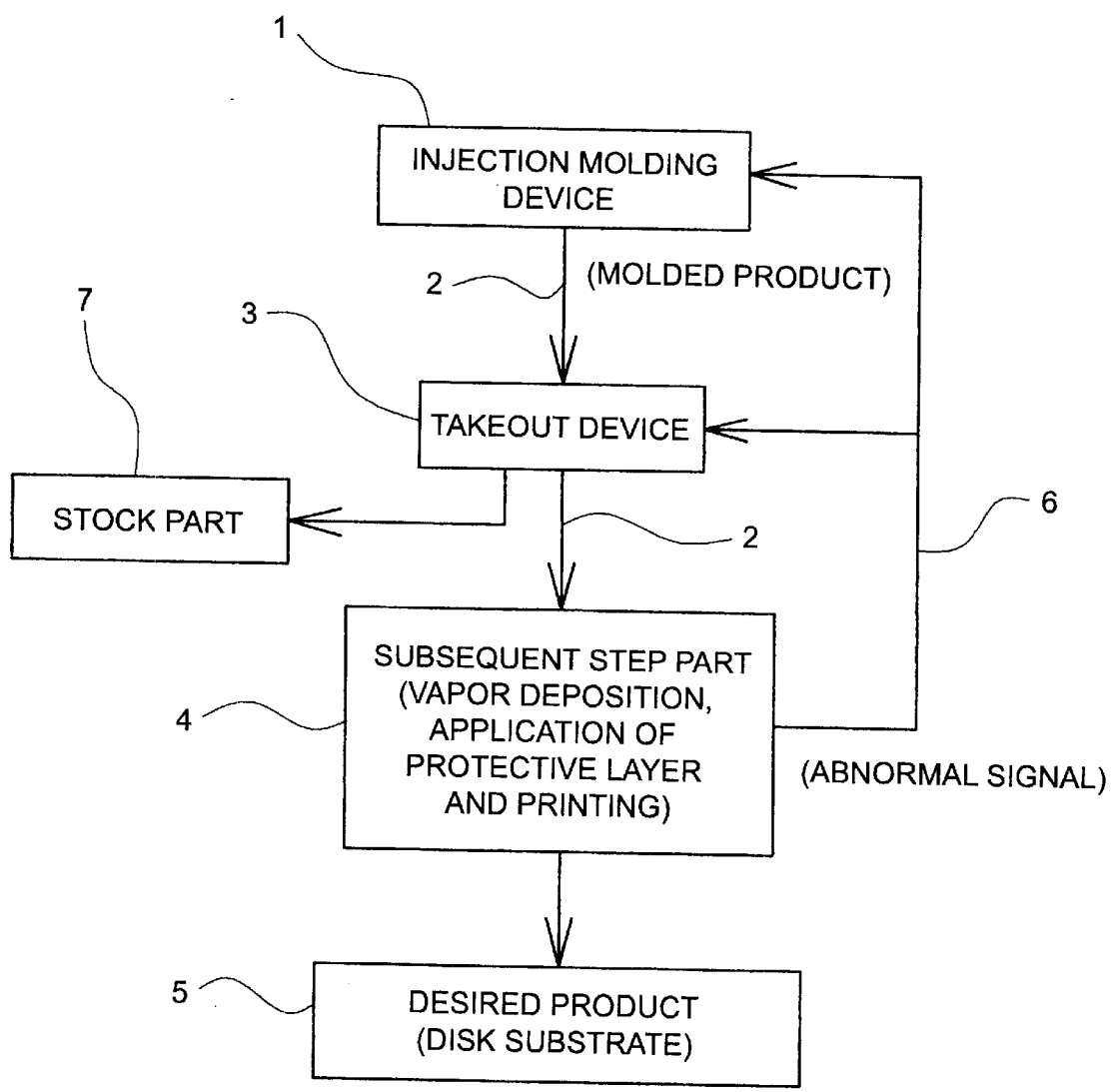
FIG. 1 is a block diagram schematically showing one example of an injection molding system utilized upon executing a method of controlling operation of the injection molding system according to the present invention.

Referring first to FIG. 1, there is schematically shown an injection molding system including an injection molding device 1, a takeout device 3, a subsequent-step part 4, a stock part 7 as a part. The injection molding device 1 may be constituted by a known injection molding device having an injection device and a mold clamping device. As well known in the art, the mold claming device is adapted to clamp a mold consisting of a pair of mold halves which are brought into contact with each other to define therebetween a mold cavity whose configuration is corresponding to that of a desired product, while the injection device is adapted to heat and melt a suitable resin material therein. The injection device is operable to injection-the molten resin into the mold cavity of the mold clamped by the mold claming device. The injection molding device 1 is operated according to a time chart of FIG. 3 so as to produce a desired product 5. It is noted that the injection molding device 1 may be constituted by a single injection molding device, or alternatively by a plurality of injection molding devices.

The takeout device 3 is adapted to take out the molded product 2 from the injection molding device 1, and then transfer the molded product 2 to the subsequent-step part 4. Various kinds of known takeout devices may be usable as the takeout device 3. For instance, an arm-type or a shoot-type takeout device is employable. More specifically described, the arm-type takeout device includes a working arm which is movable, after the mold is opened, in the vicinity of the molded product 2 held by one mold half, so as to suction the molded product 2 by applying a vacuum force to the molded product 2. The working arm is then moved to a desired portion while holding the molded product 2 by the vacuum force, so as to transfer the molded product 2 to the desired portion. The shoot-type takeout device includes a shoot member which is adapted to receive the molded product 2 ejected and dropped from the opened mold, and then to carry the molded product 2 to the desired portion.

In the subsequent-step part 4, the molded product 2 is further processed by known treatments such as vapor deposition, application of a protective layer and printing (which will be described later). The subsequent-step part 4 is provided with a monitoring device (not shown) which is adapted to detect an abnormal operation in the subsequent-step part 4, and generates an abnormal signal 6 upon detection of the abnormal operation. The abnormal signal 6 is applied to the takeout device 3. In the present embodiment, the operation of the takeout device 3 is controlled, such that the takeout device 3 changes its operation mode from a normal operation mode in which the molded product 2 is transferred to the subsequent-step part 4 to an abnormal operation mode in which the molded product 2 is transferred to the stock part 7, when the abnormal signal 6 is applied to the takeout device 3. The abnormal signal 6 is also applied to the injection molding device 1. Upon application of the abnormal signal 6, the injection molding device 1 is controlled to change its operation modes from a normal operation mode to a cycle-time extension mode or an automatically stopping mode, according to the control flow of FIG. 2.

The subsequent-step part 4 is presented in order to apply further required treatments to the molded product 2 in order to finalize the molded product 2 as a desired product 5. When the injection molding system is arranged to produce a CD, a disk substrate molded by the injection molding device 1 is further processed in the subsequent-step part 4 such that a reflector film made of pure aluminum is formed by vapor deposition on one of opposite major surfaces of the disk substrate on which the information in the form of pits has been reproduced, and then a protective film made of a synthetic resin material is formed on the formed reflector film. When the injection molding system is arranged to produce a DVD, the subsequent-step part 4 includes not only the step for forming the reflector film on the surface of each of two component disks separately molded by two injection molding devices 1, but also steps for bonding the component disks to each other at respective surfaces on which the reflector films are formed, and for printing a desired design on one or both of opposite major surfaces of a bonded composite disk. In order to improve production efficiency, the production line of the injection molding system is arranged such that the subsequent-step part 4 successively processes the molded product 2 successively transferred from the injection molding device 1, leading to no accumulation of the molded product 2 in the production line. For ensuring no accumulation of the molded product 2 in the production line, a method of controlling the operation of the injection molding system according to the present embodiment is arranged, such that the monitoring device of the subsequent-step part 4 generates the abnormal signal 6 upon detecting of the abnormal operation or malfunction in the subsequent-step part 4 which causes inability of the subsequent-step part 4 for processing the molded product 2. The generated abnormal signal 6 is transmitted to the takeout device 3 and the injection molding device 1. Upon receiving the abnormal signal 6 from the monitoring device, the takeout device 3 changes its operation mode from the normal operation mode to the abnormal operation mode so as to transfer the molded product 2 to the stock part 7, so that unnecessary transportation of the molded product 2 to the subsequent-step part 4 is effectively avoided. The injection molding device 1 changes its operation mode, upon receiving the abnormal signal 6 from the monitoring device, from the normal operation mode to the cycle-time extension mode, whereby the injection molding device 1 can be operated with an extended cycle time. In this respect, the cycle time may be extended within a predetermined range so that adverse effects of the extension of the cycle time upon resuming the injection molding operation of the injection molding device 1 is minimized.

Figure 2:
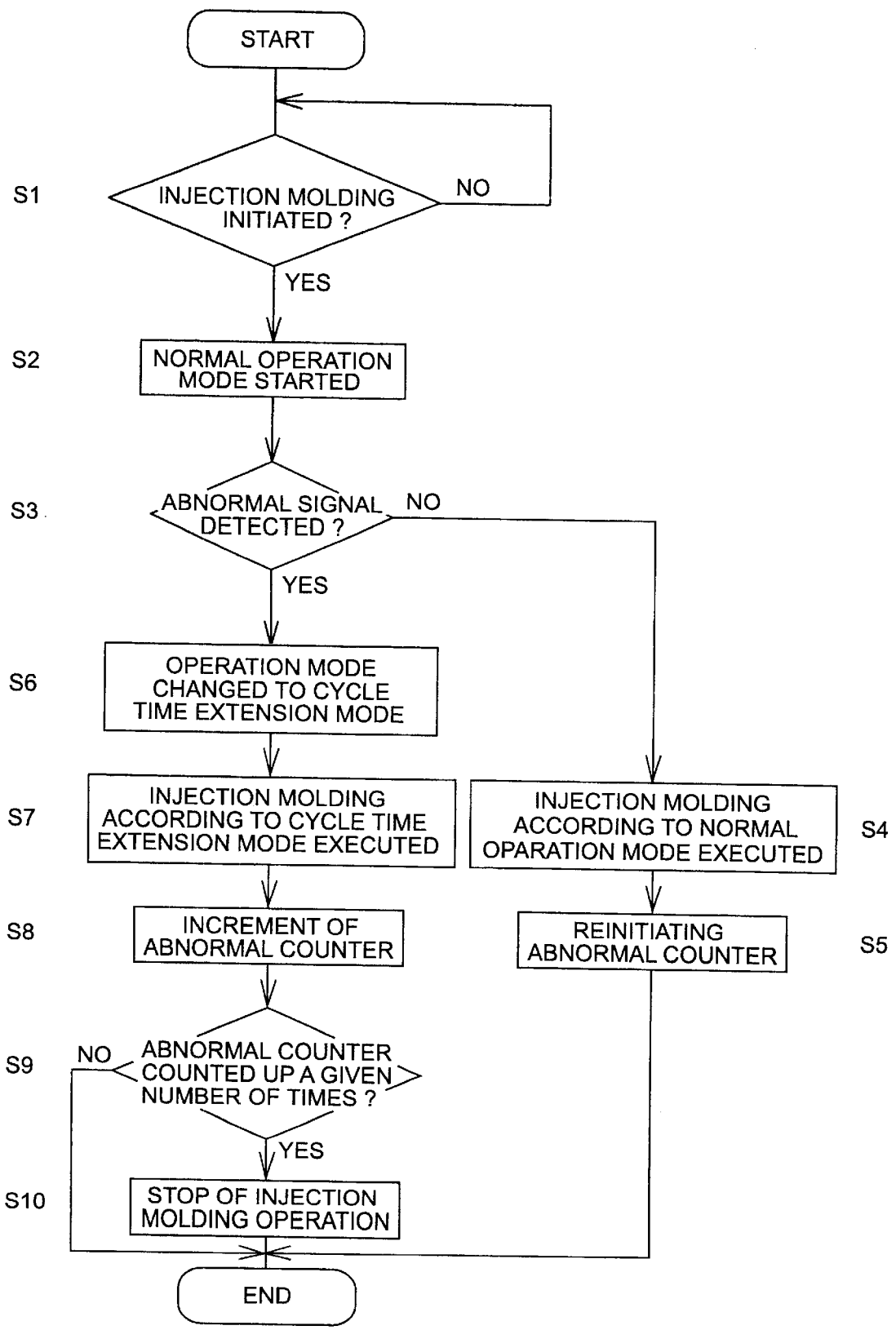
FIG. 2 is a flow chart illustrating a routine for operating an injection molding device according to selective one of a normal operation mode and a cycle-time extension mode, and for stopping the operation of the injection molding device.

Referring next to FIG. 2, there will be described in detail the operation of the injection molding device 1 which is sequentially controlled according to a flow chart of FIG. 2, by utilizing a suitable control device (not shown) such as a programmable logic controller (PLC) including a sequencer, for example. The control device includes a micro processing unit (MPU), a read only memory (ROM), a random access memory (RAM), and an input and output (I/0) port. It is noted that one operation cycle of the injection molding device 1 is started from a mold closing action, as is apparent from a time chart of FIG. 3. That is, an initiation signal is generated when the molded product 2 is taken out from the mold half by the takeout device 3. Once the current operation cycle is started, the control flow goes to Step S1 at which the MPU of the control device determines whether the initiation signal is detected. If an affirmative decision (YES) is obtained at Step S1, the control flow goes to Step S2 to allow the injection molding device 1 to initiate its operation according to the normal operation mode. If a negative decision (NO) is obtained in Step S1, the control flow goes back to recommence Step S1. Step S2 is followed by Step S3 at which the MPU judges whether the abnormal signal 6 is generated in the subsequent-step part 4. If a negative decision (NO) is obtained at Step S3, namely if the abnormal signal 6 is not generated, the control flow goes to Step S4 to allow the injection molding device 1 to execute a current injection molding cycle according to the normal operation mode. Step S4 is followed by Step S5 to initialize (e.g., initialize to zero) a counter number (n) variable of an abnormal counter for counting the number of execution of the injection molding according to the cycle-time extension mode.

On the other hand, if an affirmative decision (YES) is obtained at Step S3, namely if the abnormal signal 6 is generated in the subsequent-step part 4, the control flow goes to Step S6 at which the operation mode of the injection molding device 1 automatically changes from the normal operation mode to the cycle-time extension mode which is previously stored in the RAM of the control device. Step S6 is followed by Step S7 to allow the injection molding device 1 to execute the current injection molding cycle according to the cycle-time extension mode. The process flow goes to Step S8 at which the counter number (n) variable of the abnormal counter is increased by one. It is noted that the counter number (n) variable of the abnormal counter is increased by one every injection molding cycle according to the cycle-time extension mode.

Step S8 is followed by Step S9 at which verification is made regarding whether the value of the current counter number (n) variable is made equal to a predetermined value stored in the RAM of the control device. If the affirmative decision (YES) is obtained in Step S9, the control flow goes to Step S10 to automatically stop the operation of the injection molding device 1. The provision of Step S10 is effective to prevent unnecessary production of a larger number of disks to be disposed, when a relatively long time is needed for eliminating or repairing defects in the subsequent-step part 4. If the defects in the subsequent-step part 4 are eliminated, the abnormal signal 6 is canceled, so that the injection molding device 1 and the takeout device 3 are both continuously operated according to the respective normal operation modes.

Figure 3:
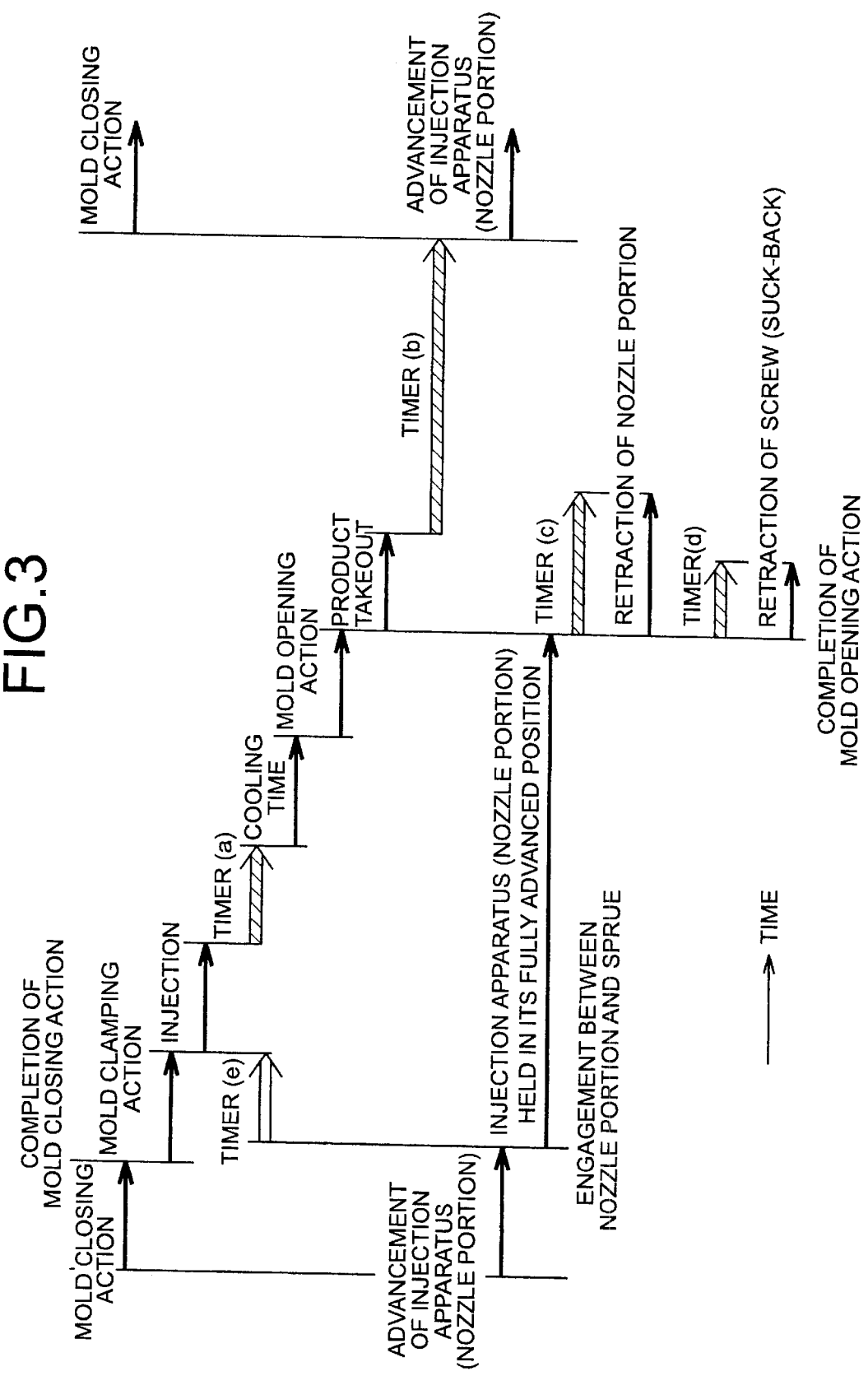
FIG. 3 is a time chart illustrating an operation condition of the injection molding machine in the cycle-time extension mode.

Referring next to FIG. 3, there will be described in detail the operation of the injection molding device 1 according to the cycle-time extension mode. Upon generation of the initiation signal, there is initiated a series of injection molding operations such as a mold closing action, a nozzle forwarding action, a mold clamping action, injection action, a cooling time, a mold opening action, a product takeout, and the like. As shown in FIG. 3, the mold closing action in the mold clamping device and the nozzle forwarding action in the injection device are simultaneously initiated. In the mold clamping device, the subsequent actions, i.e., the mold clamping action, the injection action, the cooling time, the mold opening action, the product takeout are successively executed. Depending on molding conditions, the injection device needs to execute its injection molding operation with its nozzle portion held in communication with a sprue leading to the cavity of the mold, without executing a reciprocal motion of the injection device in a direction toward and away from the mold. In FIG. 3, hatched arrows (a), (b), (c), (d) indicate timers or time counters which are available for the cycle-time extension mode, while a non-hatched arrow (e) indicates a timer or a time counter which is available when the injection device is reciprocally moved. That is, the timer (e) functions as a delay time counter for measuring a predetermined delay time (e.g., a fixed timer for 0.5 seconds) after the injection device has reached to its fully advanced position and before the initiation of the injection action, so that the injection action of the injection device is initiated when the delay time has passed. The presence of the delay time counter (e) is effective to assure a fully engagement between the nozzle portion of the injection device and the sprue leading to the mold cavity of the mold. These timers (a)–(e) are effectively constituted by utilizing functions of the control device (PLC).

The timer (a) as a first timer is arranged to initiate a measurement of a predetermined delay time after the completion of the injection action. When the timer (a) has measured the predetermined delay time, then a cooling timer initiates a measurement of a predetermined cooling time. The provision of the timer (a) leads to a substantially extended cooling time, resulting in an extension in the cycle time. In this embodiment, the timer (a) is arranged in and controlled by the control device, while predetermined values of the delay timer is stored in the RAM of the control device. While the timer (a) is constructed independently of the cooling timer in this embodiment, the timer (a) may otherwise be embodied by utilizing the cooling timer. In this case, the predetermined cooling time of the cooling timer may be extended by an appropriate delay time. Alternatively, the cooling time of the cooling timer may be arranged to be variable depending on the appropriate delay time.

The timer (b) as a second timer is arranged to initiate a measurement of a predetermined delay time after the completion of the product takeout action by the takeout device 3. When the timer (b) has measured the predetermined delay time, then the next injection molding cycle is started by the initiation of the mold closing action. The provision of the timer (b) leads to a substantially extended intermediate time after the completion of the current molding cycle and before the initiation of the next molding cycle, resulting in an extension in the cycle time. In this embodiment, the timer (b) is arranged in and controlled by the control device, while predetermined values of the delay time is stored in the RAM of the control device. While the timer (b) is constructed independently of a conventional intermediate timer for measuring a predetermined intermediate time after the completion of the mold opening action before the mold closing action, in this embodiment, the timer (b) may otherwise be embodied by utilizing the intermediate timer. In this case, the predetermined intermediate time of the intermediate timer may be extended by an appropriate delay time. Alternatively, the intermediate time of the intermediate timer may be arranged to be variable depending on the appropriate delay time.

In general, an injection molding system arranged for producing a DVD or a CD-R is required to increase temperatures of the mold and nozzle portion to a relatively high level, in comparison with an injection molding system arranged for producing a CD. Owing to the high temperatures of the mold and nozzle portion, an extension of a cooling time only by about 15 seconds does not provide significant adverse effects on the successive injection molding condition. For the above reasons, the injection molding operation according to the cycle-time extension mode can be operated in a cycle time of about 18 seconds, while the injection molding operation according to the normal operation mode is operated in a cycle time of 4–5 seconds. Thus, the number of the disposed disks produced in the injection molding according to the cycle-time extension mode can be reduced to not greater than one-thirds of the number of the disposed disks produced in the injection molding operation according to the normal operation mode. Meanwhile, the above-mentioned need for the high-temperatures of the mold and nozzle portion may possibly restrict the extension of the intermediate time. Namely, the extension of the intermediate time leads to a larger amount of heat radiation from the mold cavity, since the mold is opened during the intermediate time. This may possibly cause a significant adverse effect on the following injection molding cycle, and an increase in possibility of drawing of the molten resin out of the nozzle portion, when the injection device is moved away from the mold. Thus, it is desirable in the injection molding system arranged for producing the DVD or CD-R not to employ the cycle-time extension mode in which the intermediate time is extended.

On the other hand, the injection molding system arranged for producing a CD is generally operated to execute an injection molding operation with relatively-low mold and nozzle temperatures and with a relatively short cycle time. Due to this characteristics of the injection molding system for producing the CD, an amount of extension of the cooling time is substantially limited to as much as 8 seconds, while the intermediate time can be extended for about 5 seconds. In the injection molding system arranged for producing the CD, both of the cooling and intermediate times can be utilized for the cycle-time extension mode, thereby permitting a cycle time of about 16 seconds in its cycle-time extension mode, although the injection molding operation according to the normal operation mode requires a cycle time of 3.5–4.0 seconds. Thus, the number of the disposed disks produced in the injection molding operation according to the cycle-time extension mode can be reduced to not greater than one-fourth of the number of the disposed disks produced in the injection molding operation according to the normal operation mode.

When the injection molding system for producing the CD is operated according to the cycle-time extension mode in which the intermediate time is extended, the molten resin in the nozzle portion may possibly flow into and solidify within the sprue of the mold, if the nozzle portion of the injection device is held in communication with the sprue of the mold, resulting in undesirable closing of the sprue. To avoid this drawback, the cycle-time extension mode of the injection molding system for producing the CD is desirably further arranged such that the timer (c) as a third timer is initiate to measure a predetermined time after the completion of the mold opening action, during which the injection device is retracted in the direction away from the mold, and that the timer (d) as a fourth timer is also initiated at the same time when the timer (c) is initiated, so as to measure a predetermined time during which the screw of the injection device is retracted in the direction away from the nozzle portion of the injection device, thereby preventing drawing of the molten resin out of the nozzle. In this respect, the timers (c), (d) are constituted independently of each other and independently of the timer (b) so that an amount of retraction of the nozzle portion and an amount of retraction of the screw are respectively determined independently of each other and independently of the intermediate time determined by the timer (b).

As is apparent from the aforementioned description, an injection molding system arranged for producing a disk product such as a CD in which the subsequent-step part is required to finalize the molded product, is effectively controlled by the present controlling method so that the number of overproduced or unnecessary products to be disposed is significantly decreased, even when the injection molding device is required to continuously execute its injection molding operation under malfunction of the subsequent-step part. Further, the injection molding system for producing the CD is effectively controlled by the present controlling method so that the injection molding system is capable of resuming its injection molding operation in a short time. The present method also effectively controls an operation of another injection molding system arranged for producing a disk product such as a DVD in which two injection molding devices respectively produce component disks which are transferred to the subsequent-step part so as to be bonded together to be provided as a bonded composite disk. More specifically described, if one of the two injection molding devices is malfunctioned due to a retard of its startup operation or a stop of its operation, the other injection molding device can be controllable to be operated in a cycle-time extension mode. Therefore, the present method can decrease the number of unusable disk components to be disposed, which disk components are produced by the other injection molding device until the one injection molding device becomes available for molding the component disk.

While the present invention has been described in detail in its presently preferred embodiment by reference to the accompanying drawings, for illustrative purpose only, it is to be understood that the invention is not limited to the details of the illustrated embodiment, but may be otherwise embodied with various other changes, modifications and improvements, which may occur to those skilled in the art, in the light of the foregoing teachings, without departing from the spirit and scope of the invention defined in the subsequent claims.

What is claimed is:

1. A method of controlling operation of an injection molding system including at least one injection molding device which successively executes an injection molding operation thereof so as to successively produce a plurality of molded products, at least one takeout device successively takes out said molded products from the corresponding injection molding device so as to successively transfer said molded products to a downstream part adapted to further process said molded products, and a monitoring device adapted to detect an abnormal operation in said downstream part and generate an abnormal signal upon detection of said abnormal operation, said method comprising:

changing an operation mode of said at least one takeout device so as to transfer a molded product from among said molded products to a part which is separate from said downstream part, upon generation of said abnormal signal by said monitoring device; and extending a cycle time of said injection molding operation of said at least one injection molding device, upon generation of said abnormal signal by said monitoring device.

2. A method according to claim 1, wherein said injection molding operation of said at least one injection molding device includes a cooling time, and said step of extending said cycle time of said injection molding operation is executed by controlling said cooling time by a first timer.

3. A method according to claim 1, wherein said injection molding operation of said at least one injection molding device includes a product-takeout action and a mold closing action, and said step of extending said cycle-time of said injection molding operation is executed by controlling an intermediate time after a completion of said product-takeout action and before initiation of said mold closing action, by a second timer.

4. A method according to claim 3, wherein said injection molding operation of said at least one injection molding device further includes a nozzle portion retracting action and a screw retracting action, said nozzle portion retracting action and screw retracting action being executed at the same time when said product-takeout action is executed, while being controlled by a third and a fourth timer, respectively, said third and fourth timers being independent of said second timer.

5. A method according to claim 1, said method further comprising the step of: automatically stopping said injection molding operation of said at least one injection molding device, if said injection molding operation under generation of said abnormal signal is continuously executed a predetermined number of times.

6. A method according to claim 1, wherein said injection molding system includes a plurality of molding devices for producing said molded products respectively, and a plurality of takeout devices each being adapted to take out said molded product from, the corresponding injection molding device, said molded products being processed separately, and then being bonded together at said downstream part, and said abnormal signal being separately generated with respect to said plurality of injection molding devices so that each of said plurality of injection molding devices independently executes said step of extending said cycle time, and the corresponding takeout device independently executes said step of changing said operation mode.

7. The method of claim 1 wherein said injection molding system is adapted to mold a CD or DVD, and said molded products are disks.

* * * * *